(12) United States Patent
Lin

(10) Patent No.: US 7,614,890 B2
(45) Date of Patent: Nov. 10, 2009

(54) CONNECTOR FOR RECEIVING/PROTECTING ELECTRONIC CARD

(75) Inventor: Le-Yao Lin, Taipei Hsien (TW)

(73) Assignee: Tai Twun Enterprise Co., Ltd., Taipei Hsien (TW)

( * ) Notice: Subject to any disclaimer, the term of this patent is extended or adjusted under 35 U.S.C. 154(b) by 0 days.

(21) Appl. No.: 11/782,737

(22) Filed: Jul. 25, 2007

(65) Prior Publication Data

US 2008/0176431 A1    Jul. 24, 2008

(30) Foreign Application Priority Data

Jan. 19, 2007    (TW) .............................. 96201030 U

(51) Int. Cl.
*H01R 13/62* (2006.01)

(52) U.S. Cl. ...................................................... 439/159

(58) Field of Classification Search .................. 439/159
See application file for complete search history.

(56) References Cited

U.S. PATENT DOCUMENTS

| | | | | |
|---|---|---|---|---|
| 3,184,830 A | * | 5/1965 | Lane et al. ..................... 439/75 |
| 5,196,994 A | * | 3/1993 | Tanuma et al. ................ 361/737 |
| 5,603,629 A | * | 2/1997 | DeFrasne et al. ............. 439/331 |
| 7,175,449 B2 | * | 2/2007 | Lai ............................... 439/140 |
| 2006/0128189 A1 | * | 6/2006 | Kuo et al. ..................... 439/157 |

* cited by examiner

*Primary Examiner*—Briggitte R. Hammond
(74) *Attorney, Agent, or Firm*—Alan Kamrath; Kamrath & Associates PA

(57) ABSTRACT

A connector includes a housing having a card receiving space for selectively receiving one of two or more different electronic cards. A protective board is mounted on the bottom wall defining the card receiving space and slideable in a front/rear direction of the housing. First terminals and second terminals are mounted in the card receiving space. The protective board is not moved and the first terminals are in electrical contact with contacts of an electronic card when the electronic card is inserted into the card receiving space. When another electronic card is inserted into the card receiving space, the protective board is moved rearward to press the first terminals into guide slots in the protective board, allowing electrical connection of another electronic card with the second terminals while preventing electrical connection with the first terminals.

6 Claims, 10 Drawing Sheets

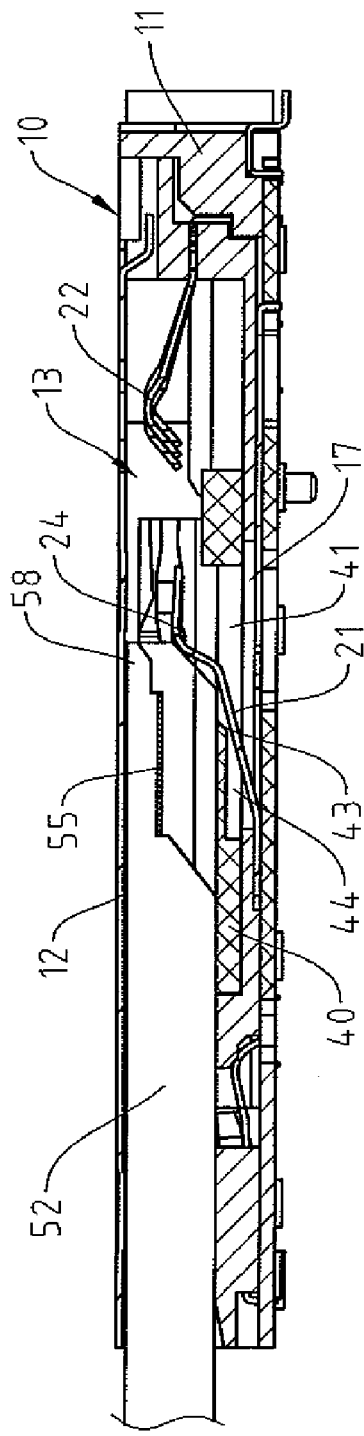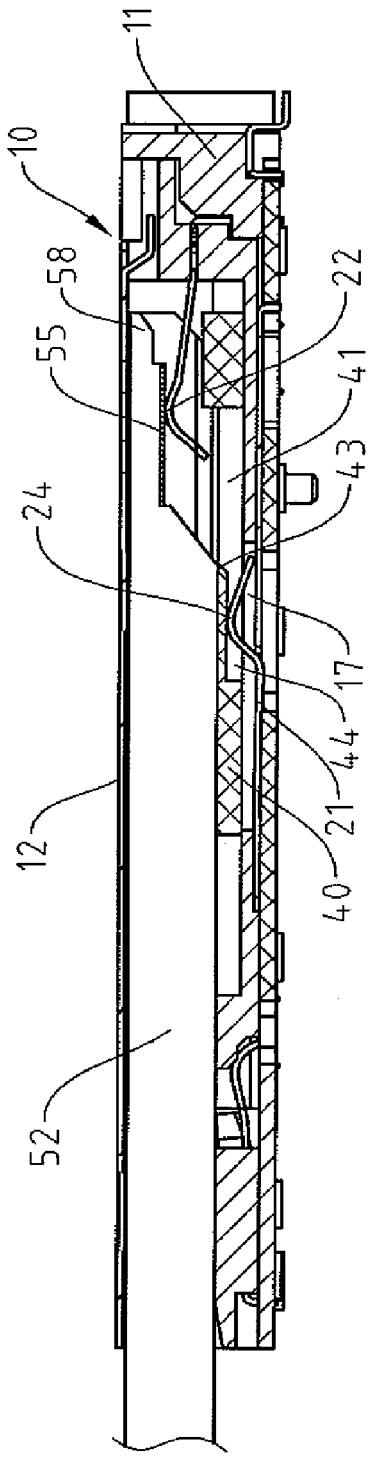

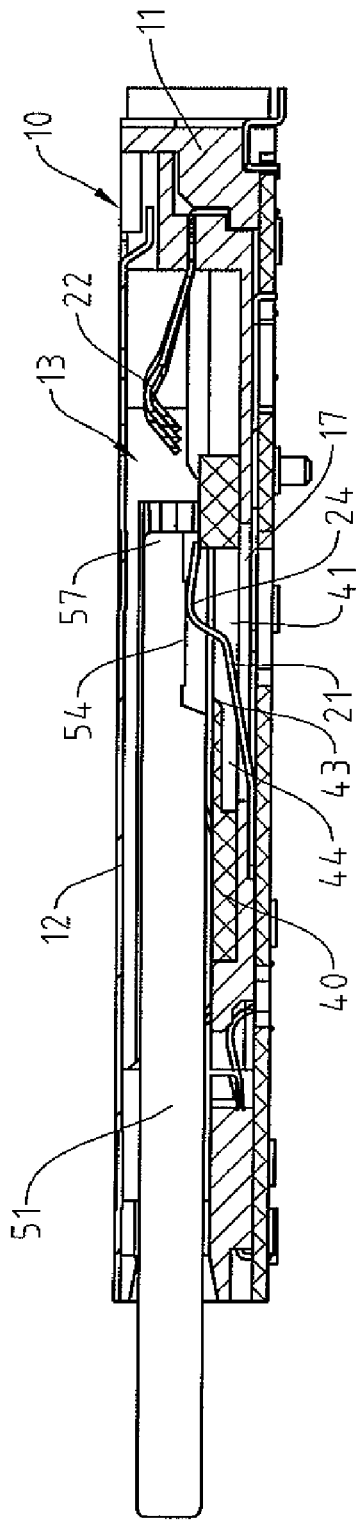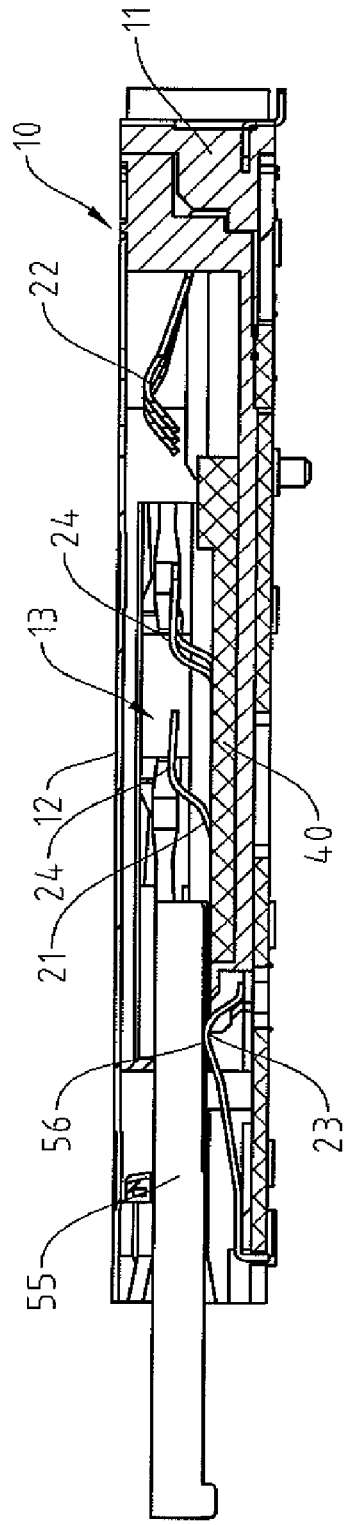

US 7,614,890 B2

CONNECTOR FOR RECEIVING/PROTECTING ELECTRONIC CARD

BACKGROUND OF THE INVENTION

The present invention relates to a connector and, more particularly, to a connector for receiving and protecting an electronic card.

Electronic cards are widely used in computers and electronic dictionaries for expanding memories, network cards, modems, and small computer system interfaces (SCSI) such as high-capacity hard disks, scanners, etc. In addition to personal computer memory card international association (PC-MCIA) cards, electronic cards include multi-media cards (MMC), compact flash cards (CF), smart media cards (SMC), memory sticks (MS), secure digital memory cards (SD) for use in personal digital assistants (PDA), portable electronic dictionaries, digital cameras, etc.

Many general-purpose connectors have been developed for selectively receiving one of a plurality of different electronic cards. A typical general-purpose connector includes front, middle, and rear rows of terminals for respectively coupling with three different electronic cards such as an XD card, a secure digital memory card (SD), and a memory stick (MS). Such a connector further includes a swingable press plate for the middle row of terminals such that a long, thick MS can be inserted into the connector to press the middle row of terminals downward through the press plate for electrical connection with the rear row of terminals. However, the press plate occupies a considerable space in the connector and requires support from the middle row of terminals, resulting in adverse affect to structural stability. Furthermore, the press plate can not precisely press and move the middle row of terminals such that the inclined portions of the terminals might come in contact with the metal housing of an MS and, thus, cause a short circuit.

It is therefore a need in a general-purpose connector without the risk of short circuit.

SUMMARY OF THE INVENTION

The present invention solves this need and other problems in the field of general-purpose connectors by providing, in a preferred form, a connector including a housing having a card receiving space with a front opening to allow insertion of one of a first electronic card and a second electronic card different from the first electronic card. A plurality of first terminals are mounted on a bottom wall defining the card receiving space. A plurality of second terminals are mounted in the card receiving space and behind the first terminals. A protective board is mounted on the bottom wall defining the card receiving space and slideable in a front/rear direction of the housing. The protective board includes a plurality of guide slots. Each first terminal includes an end portion extending through one of the guide slots into the card receiving space. The protective board includes a push portion. The protective board is not moved when the first electronic card is inserted into the card receiving space. The end portions of the first terminals are in electrical contact with contacts of the first electronic card. The second electronic card, when inserted into the card receiving space, presses against the push portion and, thus, moves the protective board rearward to press the end portions of the plurality of first terminals into the guide slots of the protective board, preventing electrical connection between the end portions of the first terminals and the second electronic card. The second terminals are now in electrical contact with contacts of the second electronic card.

A plurality of third terminals may be mounted in the housing and in front of the plurality of second terminals. The card receiving space is capable of receiving a third electronic card different from the first and second electronic cards and having a plurality of contacts in electrical contact with the third terminals when the third electronic card is received in the card receiving space.

Each guide slot of the protective board may include a front, inclined wall for pressing one of the end portions of the plurality of first terminals downward into one of the guide slots of the protective cover when the protective board is moved rearward due to insertion of the second electronic card into the card receiving space.

Each guide slot of the protective board may further include an extension defined in a bottom side of the protective board and in communication with one of the guide slots for receiving the end portion of one of the first terminals when the second electronic card is received in the card receiving space.

The push portion of the protective board protrudes outward from a side of a rear end of the protective board in a direction transverse to the front/rear direction and includes a substantially L-shaped section that abuts against a corner of the second electronic card received in the card receiving space.

A sliding member is mounted in a side of the card receiving space and slideable in the front/rear direction for ejecting the first electronic card or the second electronic card received in the card receiving space. The sliding member includes a first stop and a second stop behind the first stop. The first stop abuts against a corner of the first electronic card received in the card receiving space. The second stop abuts against a rear section of the push portion of the protective board when the second electronic card is received in the card receiving space.

The present invention will become clearer in light of the following detailed description of an illustrative embodiment of this invention described in connection with the drawings.

BRIEF DESCRIPTION OF THE DRAWINGS

The illustrative embodiment may best be described by reference to the accompanying drawings where:

FIG. 9 is a cross-sectional view of the connector of FIG. 8 with an MS card in a half inserted state.

FIG. 10 is a cross-sectional view of the connector of FIG. 9 with the MS card in a completely inserted state.

FIG. 12 is a cross-sectional view of the connector of FIG. 8 with an SD card in a completely inserted state.

FIG. 13 is a cross-sectional view of the connector of FIG. 8 with an XD card in a completely inserted state.

Figure 1:
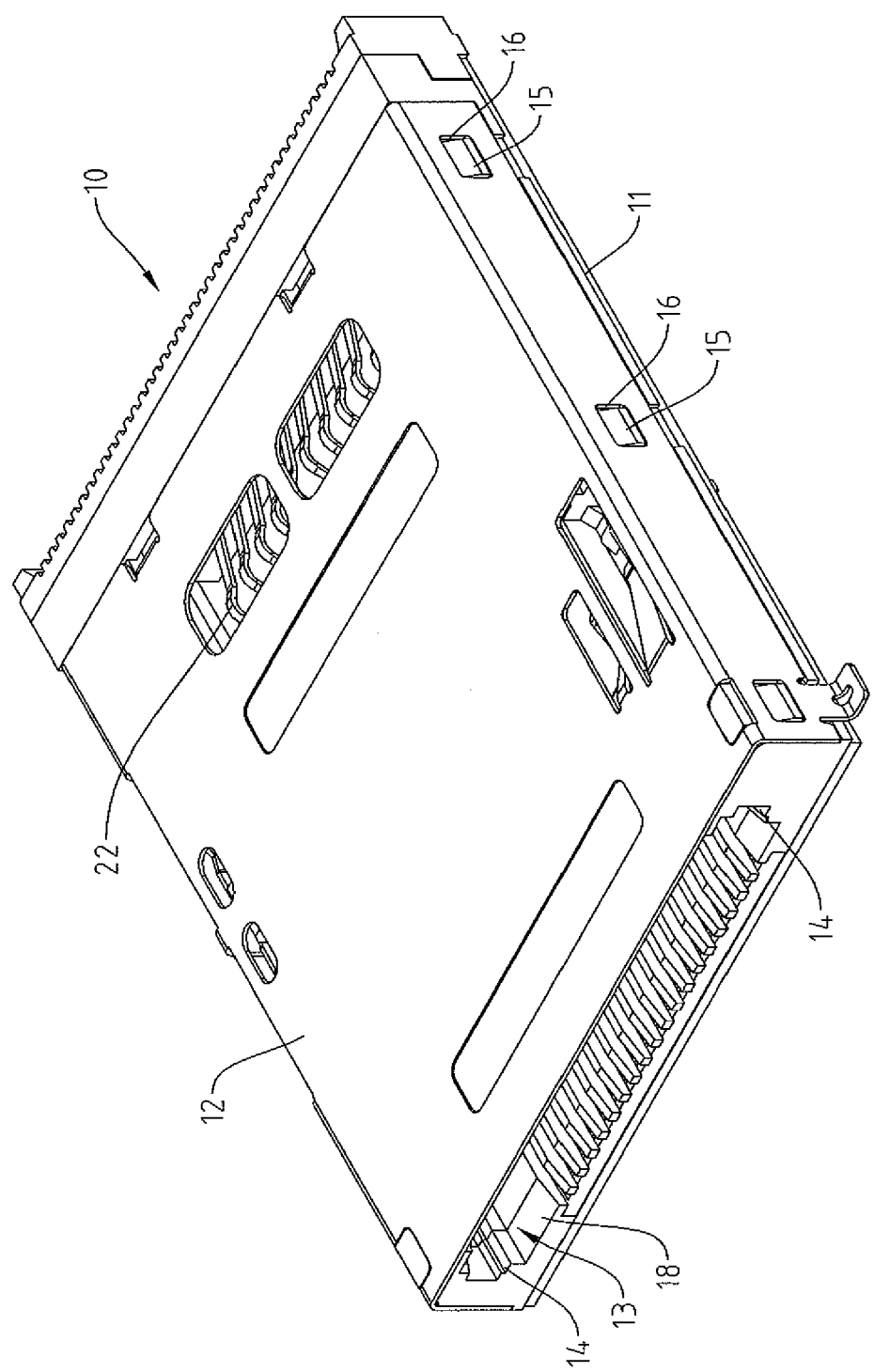
FIG. 1 is a perspective view of a connector for receiving/protecting an electronic card according to the preferred teachings of the present invention.
Figure 2:
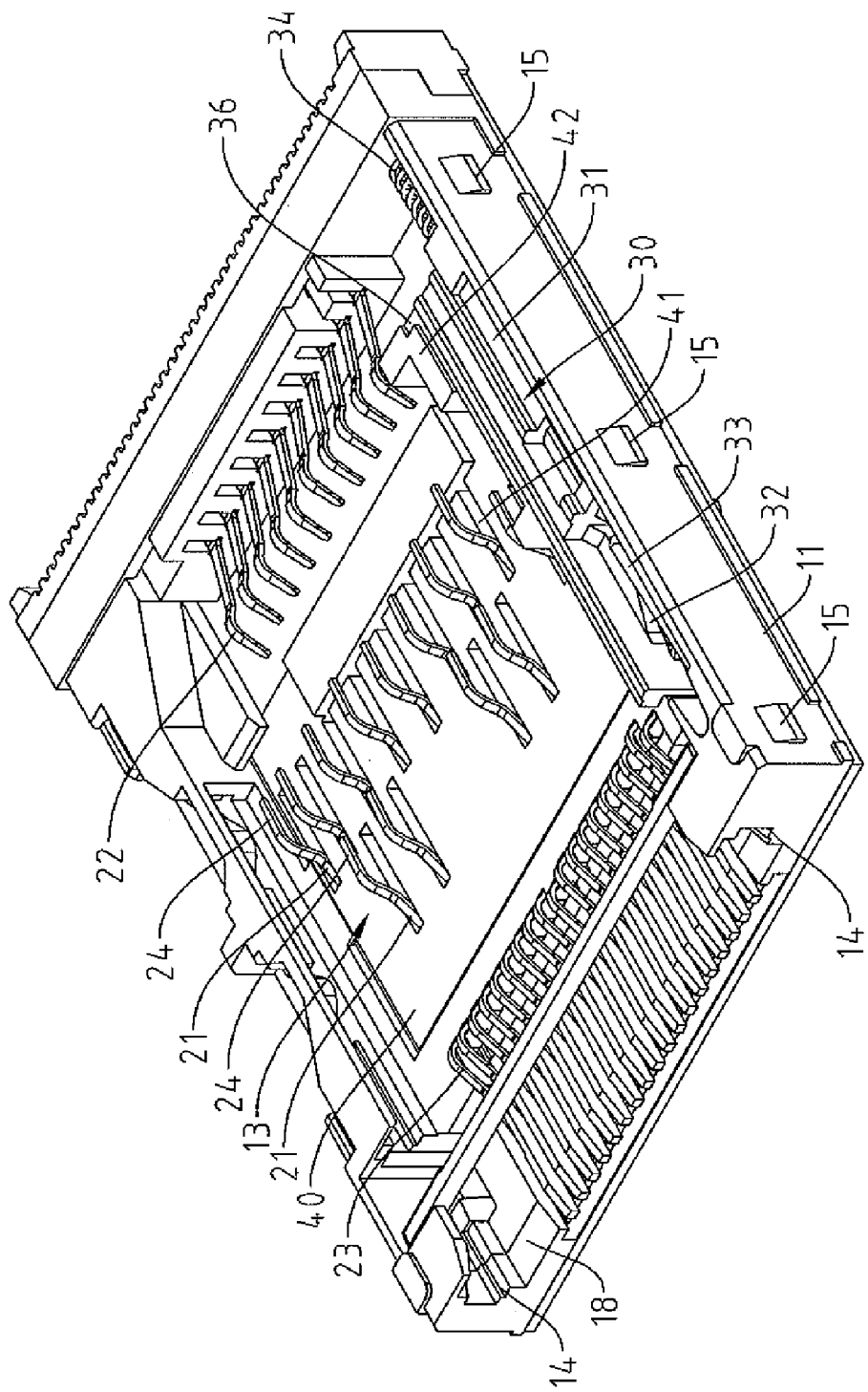
FIG. 2 is a perspective view of the connector of FIG. 1 with a top cover removed.
Figure 3:
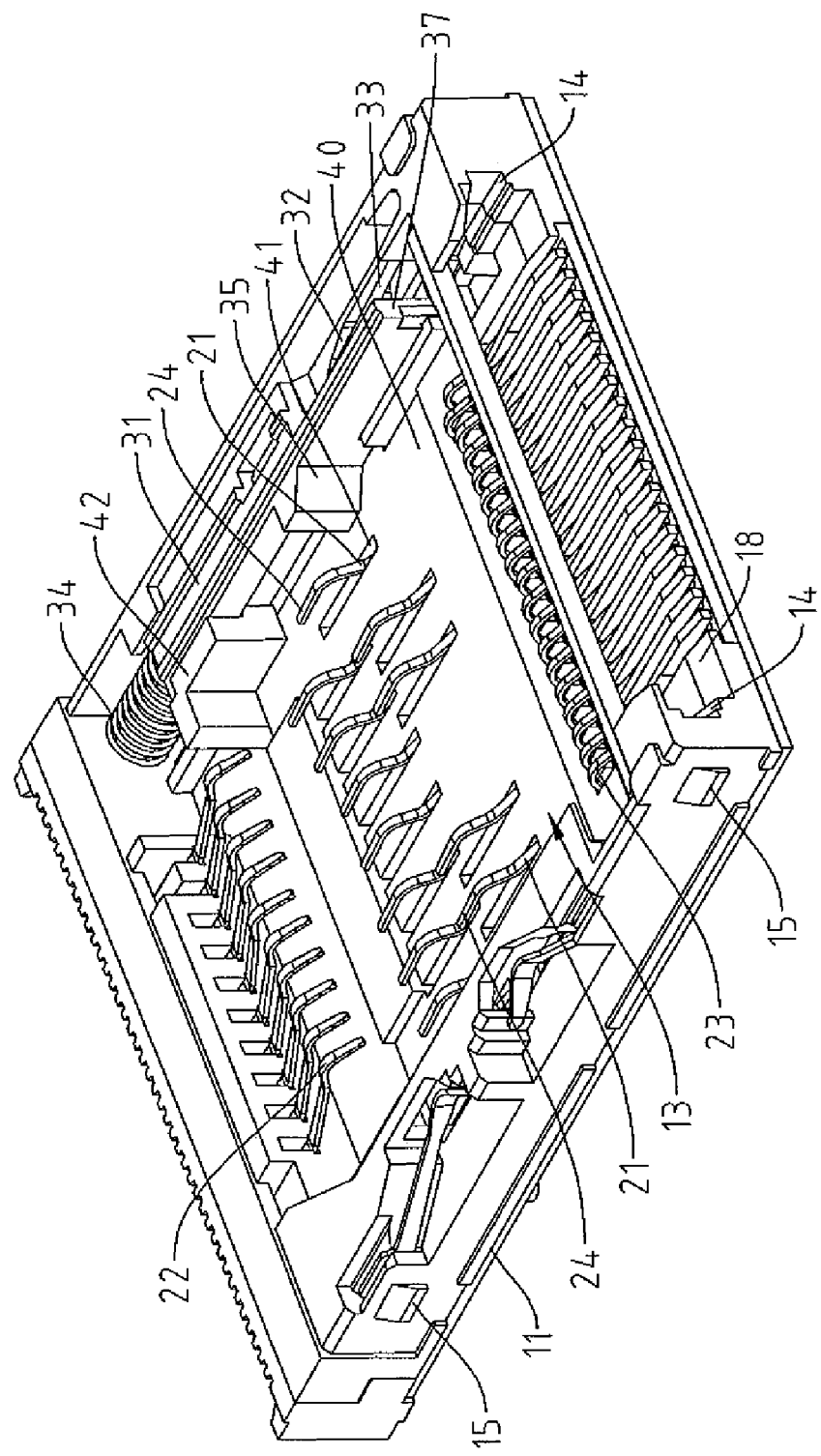
FIG. 3 is another perspective view showing the other side of the connector of FIG. 2.
Figure 4:
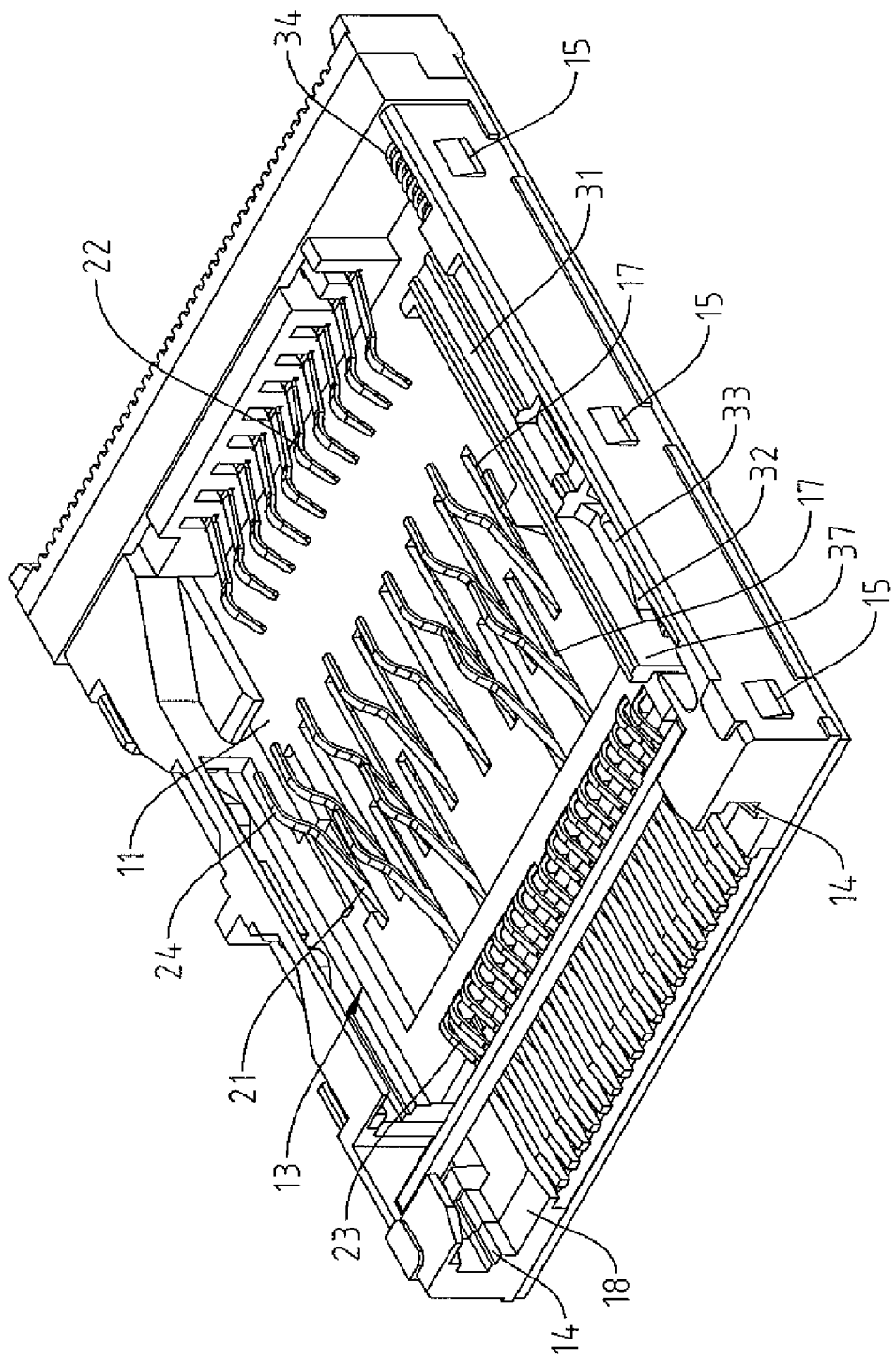
FIG. 4 is a perspective view of the connector of FIG. 2 with a protective board removed.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "top", "bottom", "behind", "front", "rear", "end", "portion", "section", "corner", "longitudinal", "lateral", "outward", "inward", "forward", "rearward", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENTS

A connector for receiving/protecting an electronic card according to the preferred teachings of the present invention is shown in the drawings. The connector removably receives one of a plurality of different electronic cards including but not limited to first, second, and third electronic cards 51, 52, and 53 such as an SD card, an MS card, and an XD card.

According to the preferred form shown, the connector includes a housing 10 having an insulating seat 11 and a top cover 12 mounted on top of the insulating seat 11 to define a card receiving space 13 with a front opening 18 through which an electronic card of a desired type is inserted into the card receiving space 13. A longitudinal track 14 is formed in each of two lateral walls defining the card receiving space 13 for receiving one of two lateral edges of the electronic card to be inserted into the card receiving space 13. The insulating seat 11 includes a plurality of protrusions 15, and the top cover 12 includes a plurality of holes 16 for engaging with the protrusions 15 to thereby fix the top cover 12 to the insulating seat 11.

First, second, and third sets of terminals 21, 22, and 23 are mounted on a bottom wall defining the card receiving space 13 for selective electrical contact with the first, second, and third electronic cards 51, 52, and 53. In the most preferred form shown, the first set of terminals 21 are arranged in two rows for coupling with the first electronic card 51 (such as an SD card or an MMC). The bottom wall defining the card receiving space 13 further includes a plurality of slots 17. Each first terminal 21 includes a resilient inclined body extending through one of the slots 17 into the card receiving space 13, with an end portion 24 on an end of the body being located in the card receiving space 13.

Figure 5:
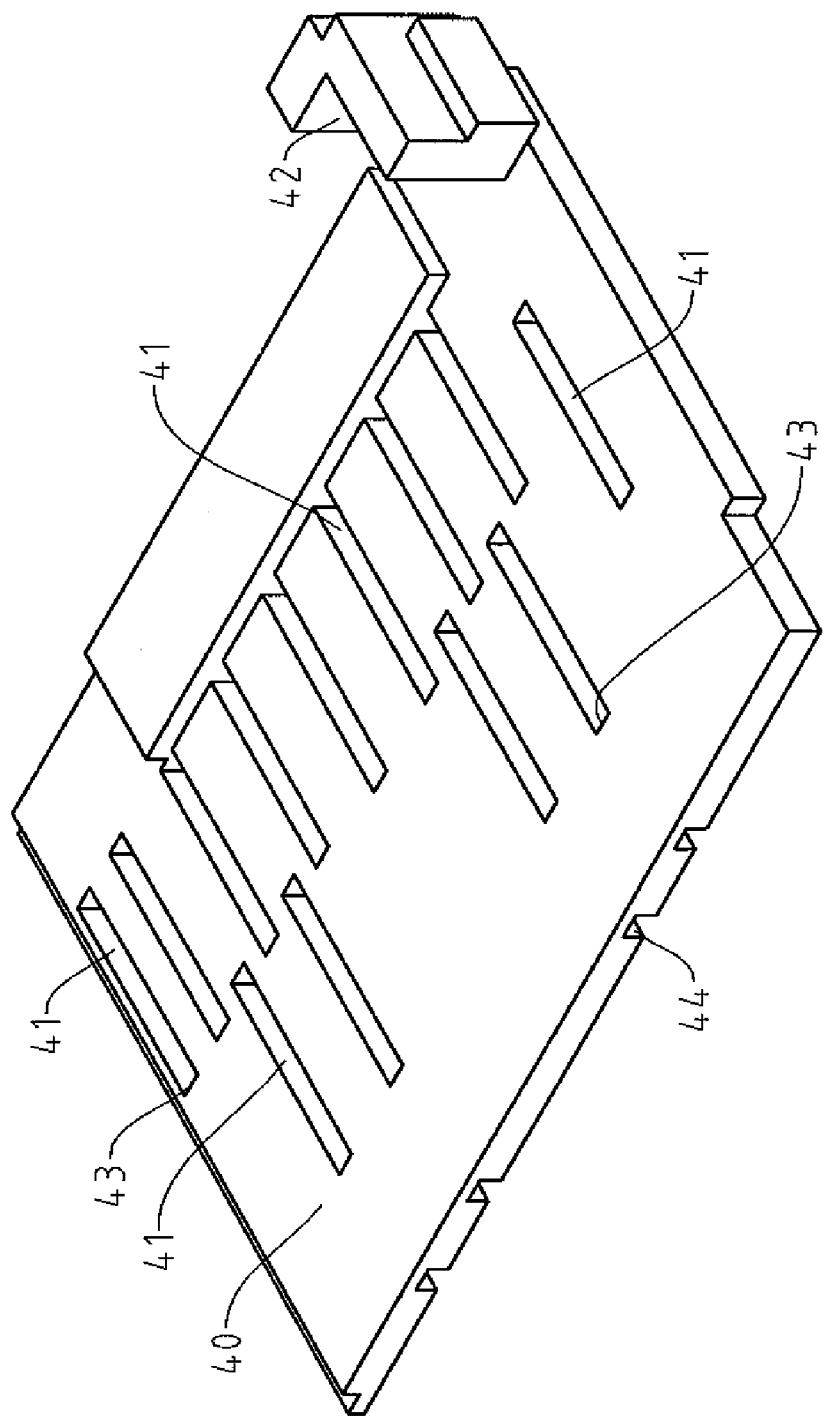
FIG. 5 is a top perspective view of the protective plate of FIG. 2.
Figure 6:
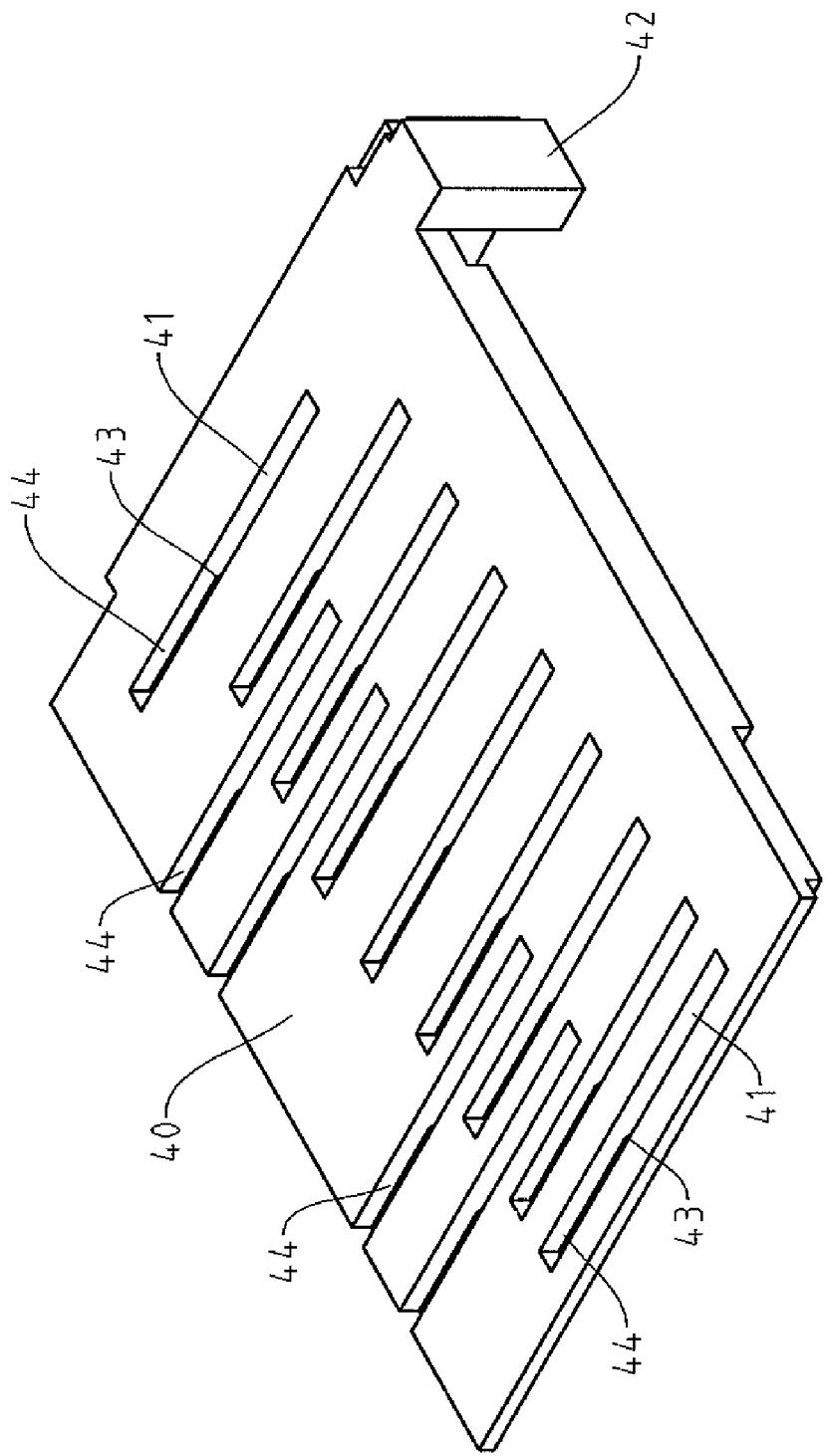
FIG. 6 is a bottom perspective view of the protective plate of FIG. 5.
Figure 7:
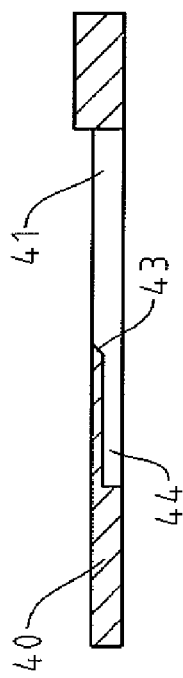
FIG. 7 is a cross-sectional view of the protective plate of FIG. 5.
Figure 11:
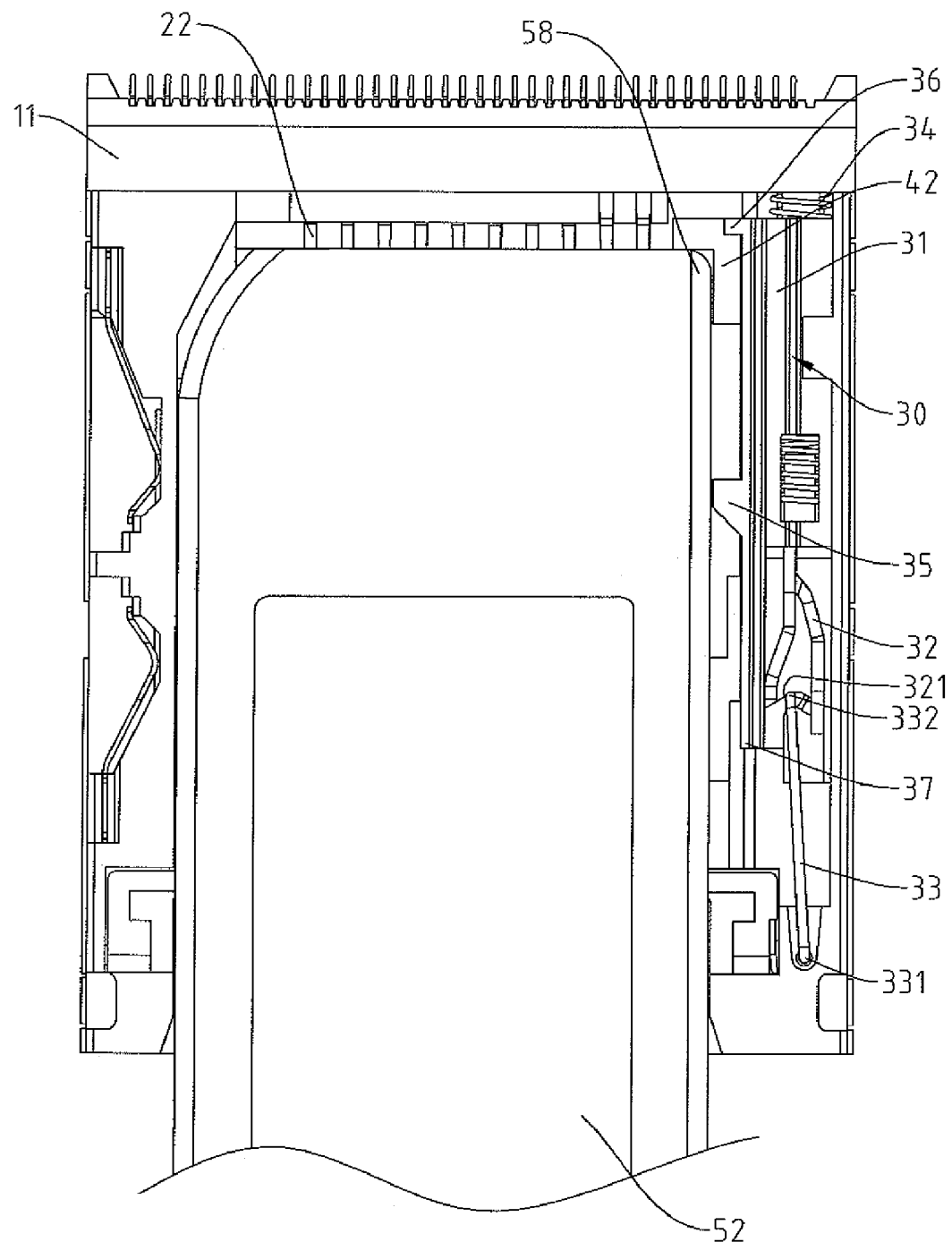
FIG. 11 is a top view of the connector of FIG. 10 with the top cover removed.

A protective board 40 is mounted on the bottom wall defining the card receiving space 13 and slideable in a front/rear direction of the connector housing 10 (i.e., the insertion/removal direction of the electronic card). With reference to FIGS. 5, 6, and 7, the protective board 40 includes a plurality of guide slots 41 respectively aligned with the slots 17. The end portion 24 of each first terminal 21 extends through one of the guide slots 41 into the card receiving space 13. Each guide slot 41 includes a front, inclined wall 43 for pressing and guiding the end portion 24 of one of the terminals 21 downward into one of the guide slots 41 of the protective board 40. Each guide slot 41 further includes an extension 44 defined in a bottom side of the protective board 40 and in communication with one of the guide slots 41 for receiving the end portion 24 of one of the first terminals 21. The push portion 42 protrudes outward from a side of the rear end of the protective cover 40 in a direction transverse to the front/rear direction. The push portion 42 includes an L-shaped section facing a front end of the housing 10 and abutting against a corner 58 of the second electronic card 52 (such as an MS card, see FIGS. 10 and 11).

A card rejecting mechanism 3 is mounted in a side of the card receiving space 13 and includes a sliding member 31 slideable in the front/rear direction of the connector housing 10. A substantially heart-shaped guide groove 32 is formed in an end of the sliding member 31 for slideably receiving a movable end 332 of a substantially U-shaped linking rod 33. The other end 331 of the linking rod 33 is pivotally connected to the insulating base 11. A spring 34 is mounted between the other end of the sliding member 31 and a wall of the insulating base 11. When an electronic card is inserted into the card receiving space 13, the sliding member 31 is moved rearward and positioned. When the electronic card is pushed again and released, the returning force of the spring 34 moves the sliding member 31 forward to move the electronic card out of the card receiving space 13. In the most preferred form shown, the sliding member 31 includes a first stop 35 on an intermediate portion thereof, a second stop 36 at a rear portion thereof, and a third stop 37 at a front portion thereof. The first stop 35 abuts against a corner 57 of the first electronic card 51 (such as an SD card, see FIG. 12) received in the card receiving space 13. The second stop 36 abuts against a rear section of the push portion 42 of the protective board 40 when the protective board 40 is moved rearward. The third stop 37 abuts against a corner of a third electronic card 53 (such as an XD card).

Figure 8:
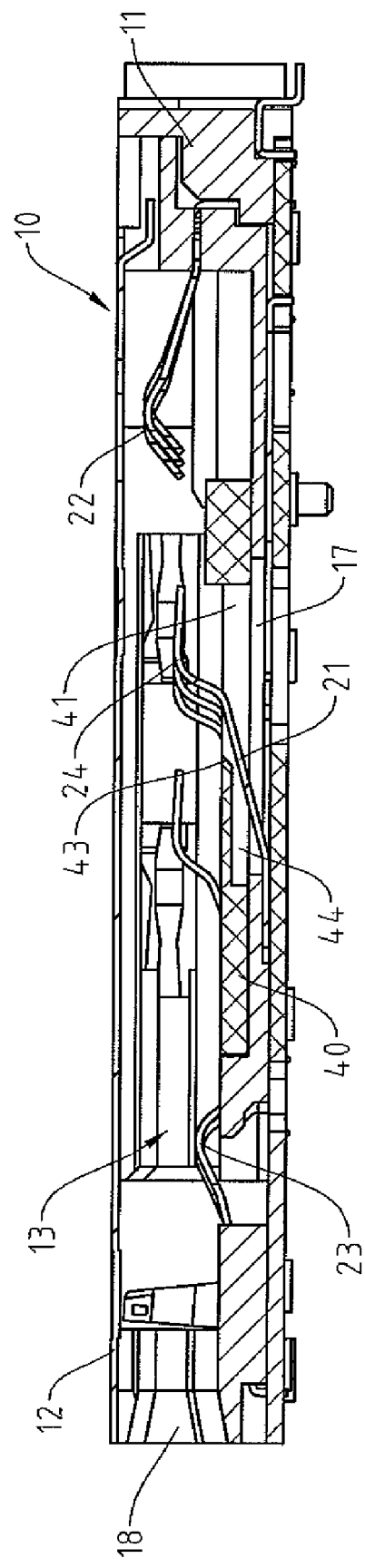
FIG. 8 is a cross-sectional view of the connector of FIG. 2.

With reference to FIGS. 8 and 9, in a case that the second electronic card 52 (such as an MS card) is inserted into the card receiving space 13 via the front opening 18, the second electronic card 52 slides on the top face of the protective board 40 until a front edge of the second electronic card 52 comes in contact with the end portions 24 of the first terminals 21. Further inward insertion of the second electronic card 52 presses the end portions 24 of the first terminals 21 downward into the guide slots 41 of the protective board 40. The second electronic card 52 that has come in contact with the push portion 42 of the protective board 40 is then moved further rearward to make the protective board 40 move rearward (see FIG. 11). Meanwhile, the push portion 42 of the protective board 40 pushes the second stop 36 and, hence, the sliding member 31 rearward. Thus, the end 332 of the linking rod 33 is moved into and retained in a positioning section 321 of the guide groove 32 (see also FIG. 11). The front, inclined walls 43 of the guide slots 41 of the protective board 40 guides the end portions 24 of the first terminals 21 to move downward away from the guide slots 41 into the slots 17 of the insulating base 11. When the second electronic card 52 is completely inserted into the card receiving space 13, the end portions 24 of the first terminals 21 are received in the extensions 44 of the guide slots 41 of the protective cover 40 and, thus, spaced from the bottom of the metal housing of the second electronic card 52, preventing occurrence of short circuits. Contacts 55 of the second electronic card 52 are now in electrical contact with the second terminals 22 (see FIG. 10). When the second electronic card 52 is pressed again, the end 332 of the linking rod 33 is disengaged from the positioning section 321 of the guide groove 32 such that the sliding member 31 and its second stop 36 move the protective board 40 forward to eject the second electronic card 52 under the action of the spring 34.

With reference to FIG. 12, in a case that a first electronic card 51 (such as an SD card) is inserted into the card receiving space 13, the first electronic card 51 slides on the top face of the protective board 40 until contacts 54 of the first electronic card 51 press against and, thus, come in electrical contact with the end portions 24 of the first terminals 21 whereas the protective board 40 is not moved. It is noted that the first electronic card 51 pushes the first stop 35 and, hence, the sliding member 31 rearward such that the end 332 of the linking rod 33 is moved into and retained in the positioning section 321 of the guide groove 32. Ejection of the first electronic card 51 can be attained by pressing the first electronic card 51 again.

With reference to FIG. 13, in a case that a third electronic card 53 (such as an XD card) is inserted into the card receiving space 13, contacts 56 of the third electronic card 53 press against and, thus come in electrical contact with the third terminals 23 in front of the first terminals 21. The protective board 40 is not moved. It is noted that the third electronic card 53 pushes the third stop 37 and, hence, the sliding member 31 rearward such that the end 332 of the linking rod 33 is moved into and retained in the positioning section 321 of the guide groove 32. Ejection of the third electronic card 53 can be attained by pressing the third electronic card 53 again.

The connector according to the preferred teachings of the present invention can selectively receive one of three different types of electronic connectors 51, 52, 53 while preventing the second terminals 22 from contacting with the metal housing of the second electronic card 52. It can be appreciated that ejection mechanisms of other arrangements can be utilized.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A connector comprising
a housing including a card receiving space having a front opening allowing insertion of one of a first electronic card and a second electronic card different from the first electronic card, with a plurality of first terminals being mounted on a bottom wall defining the card receiving space, with a plurality of second terminals being mounted in the card receiving space and behind the plurality of first terminals, with a protective board being mounted on the bottom wall defining the card receiving space and slideable in a front/rear direction of the housing, with the protective board including a plurality of guide slots, with each said first terminal including an end portion extending through one of the guide slots into the card receiving space, with the protective board including a push portion,
with the protective board being not moved when the first electronic card is inserted into the card receiving space, and with the end portions of the plurality of first terminals being in electrical contact with contacts of the first electronic card,
with the second electronic card, when inserted into the card receiving space, presses against the push portion and, thus, moving the protective board rearward to press the end portions of the plurality of first terminals into the guide slots of the protective board, preventing electrical connection between the end portions of the plurality of first terminals and the second electronic card, and with the plurality of second terminals being in electrical contact with contacts of the second electronic card.

2. The connector as claimed in claim 1, further comprising a plurality of third terminals mounted in the housing and in front of the plurality of second terminals, with the card receiving space being capable of receiving a third electronic card different from the first and second electronic cards and having a plurality of contacts in electrical contact with the plurality of the third terminals when the third electronic card is received in the card receiving space.

3. The connector as claimed in claim 1, with each of the plurality of guide slots of the protective board including a front, inclined wall for pressing one of the end portions of the plurality of first terminals downward into one of the guide slots of the protective cover when the protective board is moved rearward due to insertion of the second electronic card into the card receiving space.

4. The connector as claimed in claim 1, with each of the plurality of guide slots of the protective board further including an extension defined in a bottom side of the protective board and in communication with one of the plurality of guide slots for receiving the end portion of one of the plurality of first terminals when the second electronic card is received in the card receiving space.

5. The connector as claimed in claim 1, with the push portion of the protective board protruding outward from a side of a rear end of the protective board in a direction transverse to the front/rear direction and including a substantially L-shaped section that abuts against a corner of the second electronic card received in the card receiving space.

6. The connector as claimed in claim 1, further comprising a sliding member mounted in a side of the card receiving space and slideable in the front/rear direction for ejecting one of the first and second electronic cards received in the card receiving space, with the sliding member including a first stop and a second stop behind the first stop, with the first stop abutting against a corner of the first electronic card received in the card receiving space, and with the second stop abutting against a rear section of the push portion of the protective board when the second electronic card is received in the card receiving space.

* * * * *